Sept. 15, 1953          J. F. KANE          2,652,091

DUAL WHEEL ALIGNING RING FOR VEHICLES

Filed March 17, 1948

John F. Kane
INVENTOR

Patented Sept. 15, 1953

2,652,091

UNITED STATES PATENT OFFICE 2,652,091

DUAL WHEEL ALIGNING RING FOR VEHICLES

John F. Kane, Fall River, Mass., assignor to Kane Chain Company, Incorporated, Fall River, Mass., a corporation of Massachusetts Application March 17, 1948, Serial No. 15,446

7 Claims. (Cl. 152—220)

My invention relates to dual vehicle wheels of the spoke type, in which each wheel rim is maintained in a constant, fixed position in relation to the adjacent rim by means of an aligning ring.

With the ordinary dual wheel construction these aligning rings completely close the circumferential opening between the dual rims and this invention has for its object the provision of circumferential spaced openings in said aligning ring disposed between the wheel spokes to allow for the passing therethrough of a type of traction chain which encircles the outer tire and rim. This type traction chain is particularly adaptable for emergency use and wherein its advantages could not, heretofore, be used because of the structural limitation in this type wheel, this invention now makes such use possible.

The invention has for this, as well as other objects, the novel arrangement and combination of parts as more fully hereinafter set forth.

Figure 1:
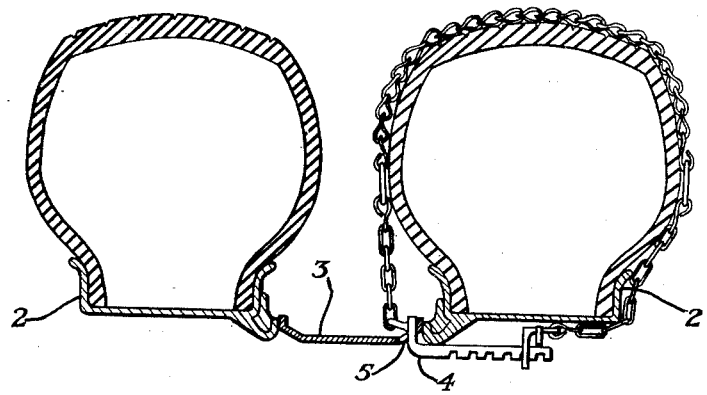
Figure 1 is a cross sectional view through a pair of dual wheels between wheel spokes showing an opening in the flange of the aligning ring and an encircling traction chain.
Figure 2:
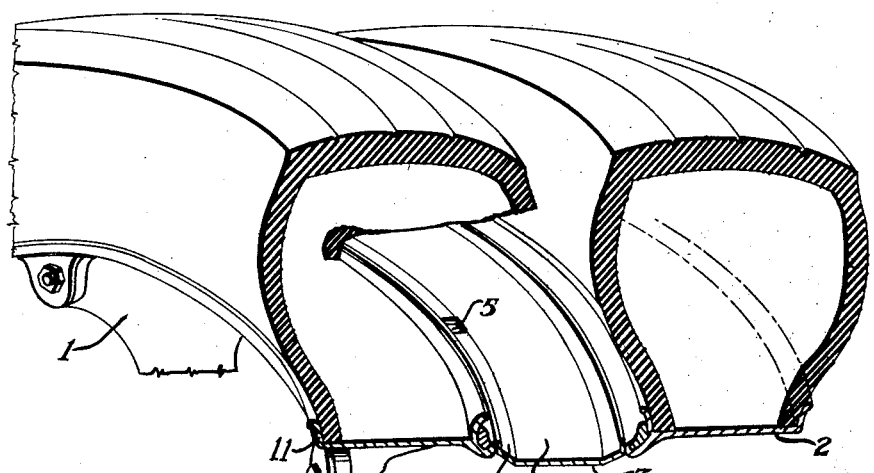
Figure 2 is a perspective view of a dual wheel with tires and an aligning ring showing a typical flange opening.
Figure 4:
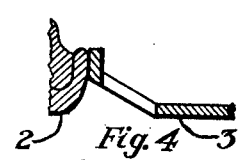
Figure 3 is a plan view and Figure 4 is a sectional view of one form of aligning ring opening.

Referring to the embodiment of my invention shown in Figures 1 to 8 inclusive, a dual wheel comprises a hub portion from which extends the wheel spider which includes radiating spokes 1, the inner rim 2 on the inside of the wheel, and the outer rim 11 on the outside of the wheel on which the tires are mounted and a separating dual wheel aligning ring 3 comprising a web portion 12 and a flange portion 13 circumferentially positioned between the rims. Also shown is a traction chain assembly 4 of a type which is adapted for attachment to the wheel by encircling the outer tire and rim. Opening 5, shown rectangular, but which also could be circular, is a form of opening in the aligning ring flange between wheel spokes allowing the encircling of the outer wheel by traction chains of the ordinary type.

Figure 7:
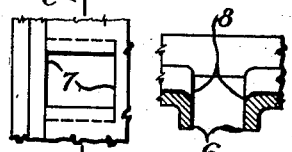
Figure 7 is a plan view and Figure 8 is a sectional view of an aligning ring opening in which additional structure is provided for engagement with one type of encircling traction chain.
Figure 8:
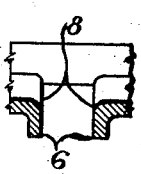
Figure 3:
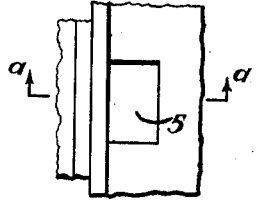

Another encircling type of traction chain assembly maintains its fixed position when placed on a wheel by acting in conjunction with the wheel structure itself and in an adaptation of my invention shown in Figures 7 and 8, the structure of the aligning ring adjacent said opening is adapted to secure this form of engagement with the chain assembly. Said opening is formed by splitting laterally the ring metal at the center 6 for the width required to pass through the necessary part of the chain assembly, slotting the opposite sides perpendicular thereto 7 and bending inwardly the partly detached metal 8, thus providing greater wheel structure for engagement with said assembly.

Figure 6:
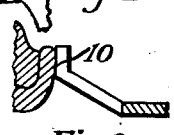
Figure 5 is a plan view and Figure 6 is a sectional view of another form of aligning ring opening.
Figure 5:
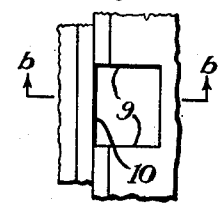

A further adaptation is shown in Figures 5 and 6, in which indentations are provided circumferentially along the edge of the aligning ring 9 by removing short portions of the aligning ring flange adjacent the outside rim disposed opposite the spaces between the spokes to allow for the encircling of the wheel and tire by the traction chain assembly. In this form of invention a more snug encirclement is provided and pressure and strain from the chain assembly as the cross chains grip the road when in operation are transmitted directly to the outer wheel rim 10.

I claim:

1. The combination with a dual vehicle wheel, comprising a hub portion, spokes radiating therefrom, and connecting inner and outer wheel rims with tires mounted thereon, of an aligning ring positioned in a circumferential plane around the wheel intermediate said rims, consisting of a web portion and flange portions adjacent said rims, said ring having a plurality of spaced flange openings, positioned between said spokes to permit the passage therethrough of traction chain assemblies of a type encircling said outer tire and wheel, the body portion of said aligning ring flange adjacent the opening and the walls of said opening, being engageable with the walls of one of said assembly members when it is in adjusted position.

2. The combination with a dual vehicle wheel, comprising a hub portion, spokes radiating therefrom and connecting inner and outer wheel rims with tires mounted thereon, of an aligning ring positioned in a circumferential plane around the wheel intermediate said rims, consisting of a web portion and flange portions adjacent said rims, said ring having a plurality of spaced flange indentations, positioned between said spokes to permit the passage therethrough of a traction chain assembly of a type encircling said outer tire and wheel, the body portion of said aligning ring flange adjacent the indentations and the walls of said flange indentation being engageable with a coinciding part of said chain assembly when it is in adjusted position.

3. The combination with a dual vehicle wheel, comprising a hub portion, spokes radiating therefrom and connecting inner and outer wheel rims with tires mounted thereon, of an aligning ring positioned in a circumferential plane around the wheel intermediate said rims, consisting of a web portion and flange portions adjacent said rims, said ring having a plurality of spaced flange indentations disposed between said spokes, and a traction chain assembly of a type encircling said outer tire and wheel, passing through one of said indentations, the coinciding parts of said chain assembly being engageable with the body portion of said aligning member flange adjacent the indentation and the walls of said indentation, when the assembly is in an adjusted position.

4. In a dual wheel of the character described, a body portion having spokes supporting inner and outer rims thereon, a flanged aligning member positioned intermediate said rims in a circumferential plane around the wheel, having a plurality of spaced flange openings, disposed between said spokes, permitting the passage therethrough of a traction chain assembly of a type encircling said outer tire and wheel, the body portion of said aligning member flange adjacent the opening and the walls of said flange opening being engageable with a coinciding part of said chain assembly when it is in adjusted position.

5. In a dual wheel of the character described, a body portion having spokes supporting inner and outer rims thereon, a flanged aligning member positioned intermediate said rims in a circumferential plane around the wheel, having a plurality of spaced flange indentations, disposed between said spokes, permitting the passage therethrough of a traction chain assembly of a type encircling said outer tire and wheel, the body portion of said aligning member flange adjacent the opening and the walls of said flange opening being engageable with a coinciding part of said chain assembly when it is in adjusted position.

6. In a dual wheel of the character described a body portion having spokes supporting inner and outer rims thereon, a flanged aligning member positioned intermediate said rims in a circumferential plane around the wheel, having a plurality of spaced flange indentations, disposed between said spokes, and a traction chain assembly of a type encircling said outer tire and wheel, passing through one of said indentations, the coinciding parts of said chain assembly being engageable with the body portion of said aligning member flange, adjacent the indentation and the walls of said indentation, when the assembly is in an adjusted position.

7. The combination with a dual vehicle wheel, comprising a hub portion, spokes radiating therefrom and connecting inner and outer wheel rims with tires mounted thereon, of an aligning ring positioned in a circumferential plane around the wheel intermediate said rims, consisting of a web portion and flange portions adjacent said rims, said ring having a plurality of spaced flange openings disposed between said spokes, and a traction chain assembly of a type encircling said outer tire and wheel, passing through one of said openings, the coinciding parts of said chain assembly being engageable with the body portion of said aligning member flange, adjacent the opening and the walls of said opening, when the assembly is in an adjusted position.

JOHN F. KANE.

References Cited in the file of this patent

UNITED STATES PATENTS

| Number | Name | Date |
| --- | --- | --- |
| Re. 19,885 | Burger | Mar. 10, 1936 |
| 1,827,792 | Keller | Oct. 20, 1931 |
| 1,901,629 | Burger | Mar. 14, 1932 |
| 2,039,554 | Rogers | May 5, 1936 |

FOREIGN PATENTS

| Number | Country | Date |
| --- | --- | --- |
| 734,796 | France | Oct. 8, 1932 |